Feb. 6, 1934.   C. H. VOGT   1,945,669
SKINLESS AND CASINGLESS SAUSAGE AND METHOD OF PACKAGING SAME
Filed Jan. 15, 1930   4 Sheets-Sheet 1
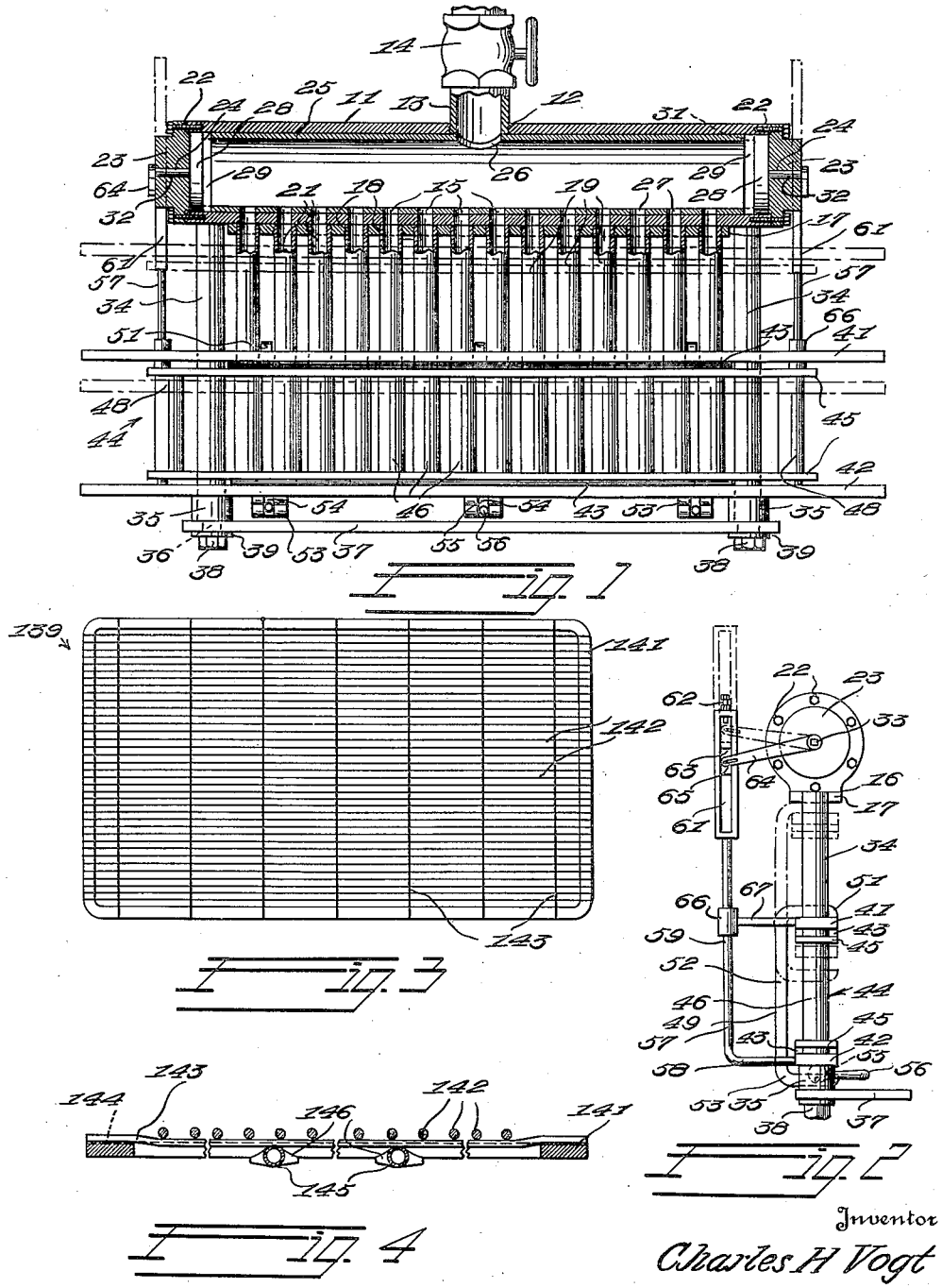
Inventor
Charles H Vogt
By Strauch & Hoffman
Attorneys Feb. 6, 1934.  C. H. VOGT  1,945,669
SKINLESS AND CASINGLESS SAUSAGE AND METHOD OF PACKAGING SAME
Filed Jan. 15, 1930  4 Sheets-Sheet 2
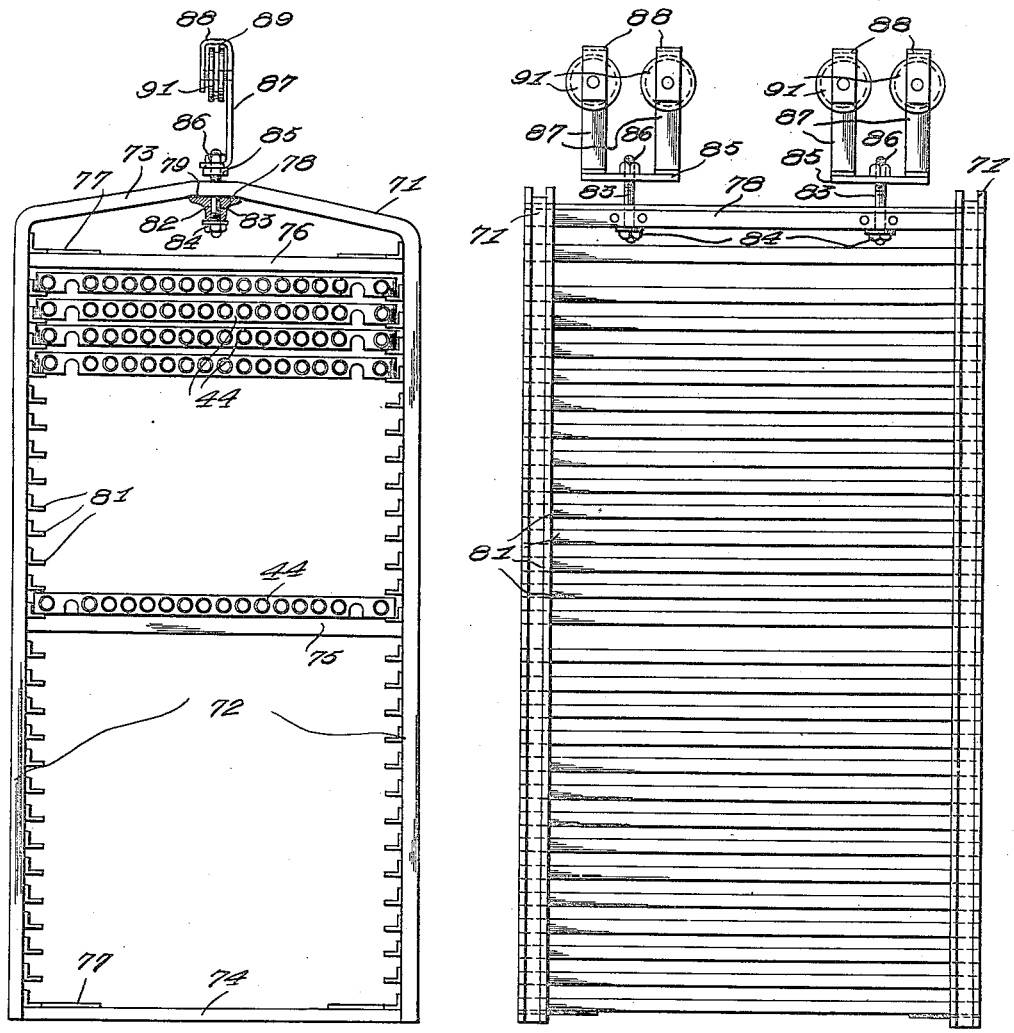

Feb. 6, 1934.  C. H. VOGT  1,945,669
SKINLESS AND CASINGLESS SAUSAGE AND METHOD OF PACKAGING SAME
Filed Jan. 15, 1930   4 Sheets-Sheet 3
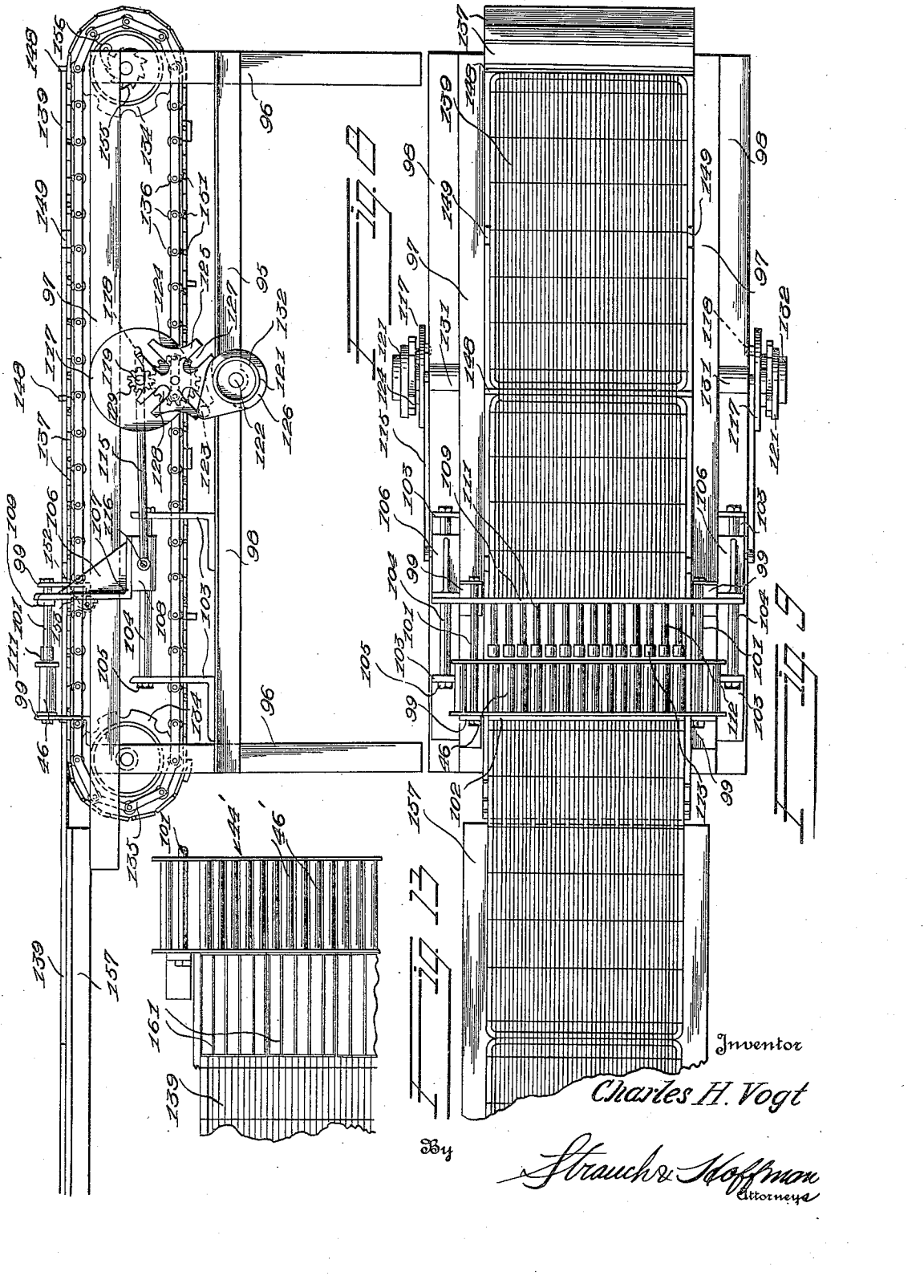
Inventor
Charles H. Vogt
By
Strauch & Hoffman
Attorneys Feb. 6, 1934.  C. H. VOGT  1,945,669
SKINLESS AND CASINGLESS SAUSAGE AND METHOD OF PACKAGING SAME
Filed Jan. 15, 1930   4 Sheets-Sheet 4
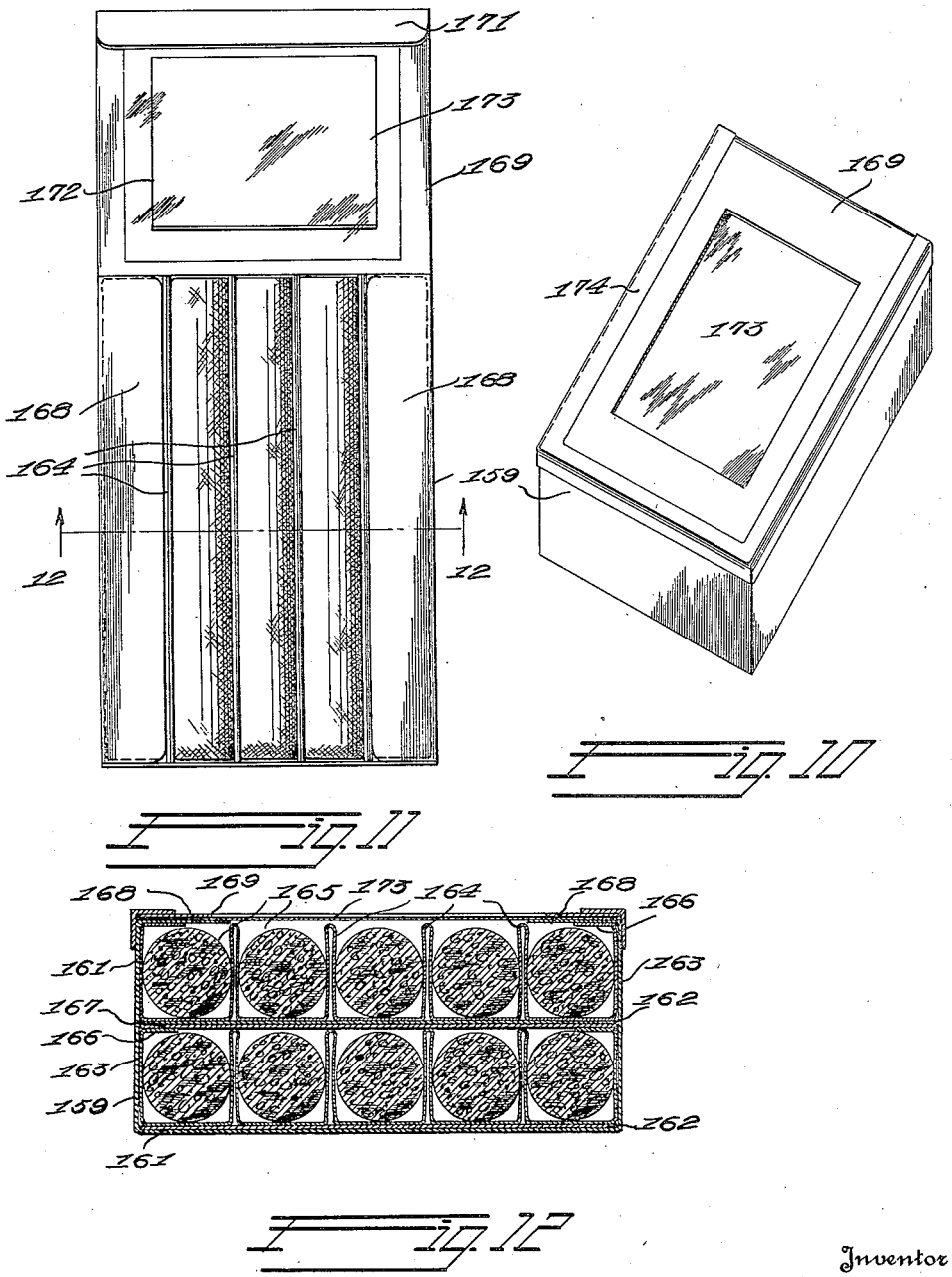
Inventor
Charles H. Vogt
By Strauch & Hoffman
Attorneys Patented Feb. 6, 1934

1,945,669

UNITED STATES PATENT OFFICE 1,945,669

SKINLESS AND CASINGLESS SAUSAGE AND METHOD OF PACKAGING SAME

Charles H. Vogt, Philadelphia, Pa.

Application January 15, 1930. Serial No. 421,014

2 Claims. (Cl. 99—11)

This invention relates to a molded meat product in the form of a sausage, that is devoid of a casing or skin, and to methods of packaging the same for the market.

This invention is concerned primarily with the marketing of sausages consisting of pork or a mixture that is predominantly of pork. As is well known, sausages have heretofore generally been put on the market in casings of animal origin. Relatively recently a commercially feasible method of forming a skin, to take the place of the animal casings, has been devised, said method producing the skin by a chemical, physical and bacterial action on the meat, constituting the body of the sausage, so that a homogeneous, smooth skin is formed from the comminuted meat constituting the body of the sausage. The latter process is entirely feasible upon sausage mixtures, that include substantial amounts of beef, since it appears that the skin forming action is an inherent characteristic of the beef entering into the sausage mixture, and that the pork that is included therein in relatively lesser amounts does not alone exhibit any tendency to form a skin. For this reason it is at present still regarded as impracticable to form a skin on a sausage consisting essentially of comminuted pork, or upon mixtures in which the amount of pork predominates.

Pork sausage has, heretofore, so far as known, been universally marketed in casings, generally of animal origin. The price of such casings has recently risen greatly, because of the demand for such casings. It has accordingly become extremely desirable to be able to put a pork product upon the market in the form of a sausage that will hold its shape during the marketing that will display a keeping quality, equal to, or superior to, the keeping quality of sausages stuffed in casings, and that will maintain its form during the process of preparing it for the table, as by cooking, frying and so forth.

It has been heretofore generally considered impractical to mold comminuted pork in the form of sausage, and secure a product that would have the degree of homogeneity and ability to hold itself together, even under ordinary handling, to make it feasible to market pork sausage in this form. I have found that, if the molding of the comminuted pork, or equivalent mixture that is predominantly pork, is brought about in a proper manner that a molded sausage can be successfully produced, that will withstand ordinary handling in marketing the sausage and that will withstand the handling and cooking tending to disrupt the sausage, when it is being prepared for the table.

I have found further, that the keeping quality of a molded comminuted pork sausage or the like, devoid of any casing or skin may be greatly improved, if such sausages are packaged in a manner permitting access of light to the package and so as to exclude the free entry of air into the package. The keeping qualities are still further improved if the molded sausages are packed in a sealed container in a manner so as to provide an atmosphere of carbon dioxide within the container after it has been sealed, thus maintaining the packed sausages in an inert atmosphere, while they are being handled, in the course of reaching the consumer. Further, if solidified carbon dioxide, known as dry ice, is used to secure the atmosphere of carbon dioxide within the container, the refrigerating effect resulting from the change in condition from the solid to the gaseous phase, further greatly contributes to the keeping qualities of the packaged product.

The primary object of the invention, accordingly, is to produce a sausage consisting essentially of comminuted pork, or a mixture that is predominantly pork, that is devoid of a casing and of a skin, but that will hold its form during the process of marketing, and during the process of preparing the sausage for the table.

A further object of the invention is to provide an improved pork sausage, or the like, that has a degree of homogeneity and ability to hold its form; that is capable of being kept a reasonable length of time without deleterious effect; that can be produced by a simple molding of the comminuted meat under pressure and treatment of the molded meat at temperatures sufficiently low to cause the molded sausage to maintain its form after the sausages have been ejected from the molds and have subsequently been raised to the temperatures at which they are marketed and handled in preparing them for the table.

A still further object of the invention is to provide a novel method of packaging skinless or casingless sausages, so that they may be subjected to handling without deleterious effect and so that they may keep a reasonable length of time after they have been packaged.

A still further object of the invention is to provide an improved method of packaging skinless or casingless sausages in a fluid atmosphere of an inert character, whereby the surfaces of the sausages are not subjected to the bacteria that are ordinarily present in the atmosphere, to the end that the keeping qualities of the product are improved.

A still further object of the invention is to provide a novel method of molding comminuted meat so as to form a homogeneous product, that is inherently capable of maintaining its form when subjected to ordinary handling operations and during the preparing of product for the table, in which the juices in the meat are utilized to serve as the binder to maintain the comminuted meat particles in adherent relation to each other.

A still further object of the invention is to provide a novel method of packaging meat products in containers without necessitating touching of the food product by the hands of operatives.

A still further object of the invention is to provide comminuted meat products of molded form, devoid of a skin or casing, that have been cured or smoked in a manner that will be thoroughly effective to enhance the keeping qualities of the product, without subjecting the product to temperatures that might cause the molded product to crumble or disintegrate.

Further objects of the invention will appear as a description thereof proceeds, with reference to the accompanying drawings, which show the apparatus at present preferred for carrying out the process of this application, and which show a preferred package in which the novel food product may be placed upon the market.

In the drawings showing said preferred embodiments:—

Figure 1 illustrates in top plan partly in section, the preferred arrangement for molding the comminuted meat product under pressure and expeditiously.

Figure 2 is an elevational view of the arrangement shown in Figure 1 as seen from the left end thereof.

Figure 3 is a preferred form of screen used in handling the product.

Figure 4 is a sectional view of the screen shown in Figure 3 on an enlarged scale, parts being broken away to reduce the size of the figure.

Figure 5 is a perspective view of a preferred form of mold structure.

Figures 6 and 7 are respectively, end and side views of suitable racks for handling a multiplicity of mold structures, and subjecting the molded product to the chilling operation.

Figure 8 is a side elevation of one form of ejecting mechanism that may be employed.

Figure 9 is a view in top plan of the construction illustrated in Figure 8.

Figure 10 is a perspective view of a preferred form of container utilized in marketing the food product.

Figure 11 is a top plan view on an enlarged scale of the container illustrated in Figure 10, the cover being raised to show the contents.

Figure 12 is a transverse section taken on the plane indicated by line 12—12 of Figure 11, looking in the direction of the arrows.

Figure 13 is a fragmental top plan view of the ejecting mechanism disclosing a modified form of mold structure and a plurality of sausage container trays supported by the ejecting mechanism for receiving sausages as they are ejected from the molds. Like reference characters designate like parts throughout the several figures of the drawings.

Referring to Figures 1, 2, and 5 in which are disclosed a preferred form of molding structures for carrying out one of the steps in the method of forming sausages, 11 designates a manifold in the form of an open ended cylinder, the cylinder being provided with a relatively large threaded aperture 12 for detachable connection with the externally threaded end of a sausage meat supply pipe 13, which pipe leads to the cylinder of a sausage stuffer (not shown) of any well known form. A suitable valve construction 14 is interposed in pipe 13 for controlling the supply of meat from the stuffer to the manifold 11.

The manifold 11 is further provided with a longitudinal series of relatively small apertures 15 in the wall thereof diametrically opposite the aperture 12. The side of manifold 11 adjacent apertures 15 is provided with a flat face 16 as is more clearly shown in Figure 2. Detachably secured to face 16 of manifold 11 by suitable securing means is an elongated flat bar 17 provided with a longitudinal series of internally threaded apertures 18 adapted to aline with apertures 15 in manifold 11. Detachably secured in each aperture 18 is the outer threaded end of a nozzle 19 the inner bores 21 of which nozzles are of the same diameter as apertures 15.

While nozzles 19 are disclosed as detachably secured to bar 17 they may be rigidly secured to the bar in any manner. It will be seen in either instance that bar 17 and nozzles 19 are removable as a unit from manifold 11.

Detachably secured to the open ends of manifold 11, as by means of bolts 22, are caps 23 each of which is provided with a central bore 24 coaxial with manifold 11. Removably disposed within manifold 11 is a cylindrical valve member 25 with the open ends thereof in spaced relation to the inner ends of caps 23. Cylindrical valve member 25 is provided with an aperture 26 of a diameter equal to the internal diameter of pipe 13, as clearly shown in Figure 1, and the valve member is further provided with a longitudinal series of apertures 27 diametrically opposite aperture 26 and of a diameter approximately equal to that of apertures 15 and bores 21 of nozzles 19.

Disposed within each end of manifold 11, between the inner end of cap 23 and the adjacent end of valve member 25, is a rotatable disk member 28 provided with a diametrical tongue 29 adapted to seat in diametrically opposed slots 31 in the end of valve member 25. Each disk member 28 is provided with a spindle 32 provided with a squared end 33, the spindles extending through and being journaled in bores 24 in the caps 23 with the squared portions extending beyond the caps.

Suitably supported by and extending outwardly from manifold 11 parallel to nozzles 19 adjacent the ends of the manifold is a pair of mold supporting and guide rods 34 provided at their free or outer ends with stop members 35, and having reduced threaded ends 36 adapted to extend through holes in the opposite ends of a handle member 37, which member is held in engagement with stop members 35 by suitable nuts 38 and washers 39 engaged with the reduced threaded ends 36.

Slidably mounted on rods 34 is a pair of parallel mold gripping bars 41 and 42 each provided with a rubber strip 43 on the side thereof opposite the other bar. The bars 41 and 42 are preferably provided with apertures to receive the rods 34, and provide a slidable connection therewith, the bars extending an appreciable distance beyond the sides of the oppositely positioned rods 34 for a purpose later described. Bar 41 and its rubber strip 43 are provided with holes for slidably receiving nozzles or filling tubes 19 and bar 42 is imperforate between guide rods 34.

A mold structure 44 indicated in Figures 1 and 2 and shown in perspective in Figure 5 is provided for each filling or molding operation and which comprises a pair of spaced parallel side bars 45 and a series of tubes 46 having smooth inner surfaces of such bore that nozzles 19 will readily enter them and equal in number to the nozzles 19. Tubes 46 are disposed transversely to bars 45 with the ends thereof suitably secured in the bars and opening through the same.

Bars 45 are provided with recesses 47 adapted to removably engage guide rods 34, and to permit sliding motion of the mold 44 relative to the guide rods. The mold structure 44 is further provided with tubular handles 48 suitably secured to side bars 45.

The mold structure 44 is adapted to rest between bars 41 and 42 with bars 45 in engagement with the rubber strips 43. Bars 41 and 42 and the mold structure 44 in operation of the apparatus are designed to move in unison toward and from the manifold 11 with tubes 46 telescoping nozzles 19. The mold structure 44 is accordingly detachably secured between bars 41 and 42 by clamp members 49 each of which is of substantially U-shape having the inner narrow leg 51 thereof rigidly secured to the outer face of bar 41 and resting between an adjacent pair of nozzles 19, the body portion 52 extending outwardly toward bar 42 under the mold structure 44 and the other or outer comparatively wide leg 53 extending in outwardly spaced relation to the outer face of bar 42 and provided with a recess 54.

Journaled in each recess 54 is an eccentric 55 provided with a suitable manipulating handle 56 upon proper movement of which the eccentric is moved into engagement with the bar 42 and the bars 41 and 42 accordingly drawn toward each other thus binding the mold structure 44 firmly between the rubber strips 43. Three such clamps are disclosed but more or less may be employed to firmly clamp the mold structure between bars 41 and 42.

As indicated in Figure 1, in outer position, bar 41 and the associated rubber strip 43 engage the outer ends of nozzles 19 with the rubber strip flush with or extending slightly beyond the ends of the nozzles to permit ready removal of the mold structure 44 upon releasing the clamps and in the outer position bar 42 engages stops 35.

While valve 25 may be actuated by hand, means may be provided to automatically actuate the valve 25 by movement of the mold structure 44. For this purpose an L-shaped rod 57 may be provided adjacent each end of the bar 42 having the short leg or extension 58 thereof rigidly secured to bar 42 in any suitable manner. The comparatively long legs 59 of the rods 57 extend from the bar 42 inwardly toward the manifold 11 in parallel relation to guide rods 34, and outwardly of and under the rod 34, as is clearly indicated in Figures 1 and 2.

Each leg 59 carries at the free end thereof an elongated grooved or slotted head 61 provided with an adjustable screw 62 at the inner end thereof. Slidably mounted in the slot of head 61 is a block 63 to which is secured the outer end of a crank 64 by a lost motion pivotal connection as indicated at 65. The opposite end of each crank 64 is provided with a squared aperture to fit the squared end 33 of spindle 32 thus providing driving connection between the cranks and spindles. The intermediate portions of legs 59 are preferably slidably supported in guides 66 which are in turn supported from bars 34 by means of suitable arms 67.

The construction herein above described is preferably removably supported at a suitable distance above the floor with nozzles 19 and tubes 46 extending horizontally by any suitable means, such, for example, by a rack as disclosed in my copending application Serial Number 255,941, filed February 21, 1928.

In the operation of the apparatus herein before described, valve 25 is normally so positioned that apertures 27 will be out of alinement with apertures 15 and opening 26 is out of alinement with the opening of pipe 13 so that no meat can flow from the manifold through the nozzles 19. A supply of empty molds 44 are available and in ready reach of the operator, who when the bars 41 and 42 are in outward position as illustrated in Figures 1 and 2 seizes one of the mold structures from one side of the apparatus and carries it inwardly between the bars 41 and 42 longitudinally thereof, until the slots 47 aline with the guide rods 34, whereupon the mold structure is released with the guide rods 34 resting in the slots 47 and the bars 41 and 42 contiguous to the side bars 45 of the mold structure. The operator now actuates the handles 56 to draw the eccentrics 55 into engagement with the bar 42, whereupon the mold structure is tightly clamped between the bars 41 and 42 with the rubber strips 43 engaging the bars 45 to prevent injury thereto and to provide a cushion connection. The operator now pushes forwardly on the bar 42 carrying the mold structure 44 inwardly toward the manifold 11 with the tubes 46 thereof telescoping the nozzles 19, until the outer ends of the nozzles approach the end of the tubes 46 which have been closed by means of the rubber strip 43 carried by bar 42. As the bars 41 and 42 move toward the manifold 11 the rods 57 move simultaneously therewith carrying the grooved or slotted heads 61, until the outer ends of the slots or grooves engage the corresponding ends of blocks 63 just before the bars 41 and 42 and mold structure 44 reach their inward limit thus imparting movement to the arms 64 and rotating cylindrical valve 45 to completely aline the apertures 15 and 27 when the mold structure has reached its extreme inward limit. Sausage meat under pressure, which has been introduced into the manifold 11 from the sausage stuffer through pipe 13 and open valve 14, now enters the nozzles 19 through the alined apertures 27 and 15 and into the outer closed ends of the tubes 46. The operator holds the mold structure firmly and with considerable pressure against the nozzles. As the sausage meat enters tubes 46 from the nozzles 19 the mold structure and associated bars 41 and 42 are forced outwardly by the pressure of the meat, which pressure is sufficient to express the juices from the meat to an extent sufficient to fill all voids between the meat particles and to serve as a binder to maintain the comminuted meat particles in adherent relation to each other. The pressure may vary from 35 to 80 pounds at the nozzle of the stuffer, but preferably a pressure of 55 pounds is utilized for most effective results.

During the outward movement of the mold structure the ends of the screws 62 engage the adjacent ends of blocks 63 such that when sufficient meat has been injected into the mold to complete the outward movement of the mold with bar 42 engaging stops 35, the valve 25 is completely closed with apertures 15 and 27 entirely disalined. As the meat fills the molds the air escapes around nozzles 19 through the apertures in bar 41 and bar 41 scrapes the meat off the tubes into the mold. The clamps are now released permitting bar 41 to move inwardly out of engagement with the mold structure and the mold is ready for transportation to the cooling room.

In this way the molds may be tightly and rapidly filled under pressure, little time being required to fill the tubes of each mold structure. In order to facilitate the application of the mold structures to and the removal from between the bars 41 and 42 the body portions 15 of the clamps lie below the bars 41 and 42, thus permitting the mold structures 44 to be expeditiously inserted and removed from between bars 41 and 42, it being only necessary to manipulate the handles 56 to clamp the mold structures in position and to release same after having been filled. Valve 14 permits closing the line between the sausage stuffer and the manifold 11 at will to permit or check the flow of meat from the stuffer to the manifold.

The mold structures after being filled under pressure in the manner above set forth are transferred to a chilling room or tank, where the sausage within the molds is subjected to temperatures sufficiently low to cause the molded sausage to withstand the force necessary to eject them substantially intact from the molds and to maintain its form after the sausages have been ejected from the molds, and have been raised to the temperatures at which they are marketed and handled in preparing them for use.

The temperature in the cooling room is maintained from 0° to 20° F., and the molds may be kept therein for a length of time sufficient to set the molded product. This may be accomplished in one or two hours. During such time the fats are solidified, and a chemical or physical change takes place causing a setting of the colloids, that are freed from the solids and fill the voids between the meat particles themselves, and the meat particles and the walls of the mold. A solid sausage is thus formed and such sausage may be ejected from the molds as hereinafter described with substantial mutilation thereof, and when ejected, the outer surfaces of the sausage are smooth, and have a homogeneous appearance. The smooth appearance is believed to be due to the fact that the fats and colloids are expressed from the meat mixture in the molding under pressure, and are reabsorbed by the solids only in part where the molding operation is completed. The freed fats and colloids are set in the chilling of the molded product, and it is found retain their set condition after again subjected to ordinary handling temperatures, and withstand the handling that is an incident to subsequent marketing and to subsequent cooking, frying, etc.

While the filled molds may be transported to and from the chilling room by any suitable means they are preferably conveyed in mold storing and conveying cages or racks of the character disclosed in Figures 6 and 7, and which comprises a pair of end members 71 each comprising a pair of laterally spaced parallel vertically extending members 72 integrally or otherwise united at the upper ends thereof by an outwardly bowed member 73, and rigidly connected at the lower ends thereof by means of members 74. The intermediate portions of members 72 are further connected by means of a member 75 disposed in parallel relation to the member 74, and said members 72 are further connected adjacent member 73 by a member 76 all of said members preferably being U-channel irons, as is indicated in Figure 7. The corners of the cage adjacent the upper and lower ends thereof are preferably braced by suitable plates 77 rigidly secured to the members 72, 74, and 76. The end members 71 are rigidly connected in spaced parallel relation by means of a T-iron 78 having the opposite ends thereof connected to flattened portions 79 intermediately disposed in the members 73 and a series of vertically spaced parallel angle irons 81 having their opposite ends rigidly secured to members 72 and which angle irons provide a rack or support for the opposite ends of the mold structures 44 as is clearly indicated in Figure 6. Intermediate the oppositely disposed end members 71 the T-iron 78 is provided with a pair of longitudinally spaced apertures 82 in each of which a rod 83 is disposed having the opposite ends threaded. Engaged with the inner threaded ends of rods 83 are nuts and washers 84 which engage the inner edge of the web of T-iron 78 and detachably and pivotally supported by the outer end of each rod 83 is a plate 85 held against outward movement on the rod by a nut 86. Each plate 85 is provided with a pair of vertically extending longitudinally spaced bars 87 the upper ends of which are of U-formation as indicated at 88 providing pulley receiving channels 89 in each of which a pulley 91 is journaled.

The cages are thus provided with four longitudinally spaced pulleys which will readily pass around short curves and are adapted to engage a suitable track in order to transport the cage from the filling or molding apparatus above disclosed to the cooling or chilling room when the cage has been completely filled with loaded sausage molds 44, and back again. The cages are also preferably employed for conveying the molds from the chilling room to the pushing out or ejecting mechanism about to be described.

The loaded sausage molds after being subjected to a process of chilling are transported to a pushing out or ejecting mechanism, preferably of the character disclosed in Figures 8 and 9, which is adapted for continuous operation for facilitating the ejecting of the sausages from the tubes of the molds.

The ejecting apparatus may comprise a frame 95 embodying four vertical leg members 96 which are preferably secured at their inner and outer ends by transversely disposed supporting members. The frame 95 further comprises a pair of laterally spaced longitudinally extending angle bar supporting members 97 at the outer ends of legs 96 and similarly disposed supporting members 98 inwardly of members 97.

Supported on each of the members 97 adjacent one end thereof is a pair of brackets 99 the vertical legs of which support the opposite ends of a guiding and supporting rod 101, the brackets 99 and rod 101 on one side of the frame being in transverse alinement with those on the opposite side of the frame. Secured at its opposite ends to one pair of transversely alined brackets 99 is a slotted guide 102, and supported by each of the members 98 is a pair of L-shaped brackets 103 the upper ends of the vertical legs of which support guide rods 104 which are detachably secured to the brackets by nuts 105. Slidably mounted on each of the rods 104 is a carriage 106 which comprises an L-shaped bracket 107 provided at the base thereof with a tubular guide and supporting member 108 through which rod 104 passes. Carriages 106 at opposite sides of the frame have secured, at the upper ends of brackets 107 thereof, the opposite ends of a pusher bar 109, provided with a plurality of pushers 111 corresponding to the number of slots in guide plate 102. Each pusher or ejector 111 comprises a rod 112 provided with a head 113 which heads are adapted to enter the bores of tubes 46 of the mold structures for ejecting the sausages therefrom.

Carriages 106 are mounted for reciprocating movement on rods 104. To actuate the carriages, rods 115 are pivotally secured at one end thereof by pins 116 to the tubular guide members 108 and at their opposite ends are pivotally connected to crank disks 117 by means of crank pins 118. Crank disks 117 are supported on a shaft 119 suitably journaled on the frame work. Upon each complete revolution of disks 117 the ejector bar 109 will be given one complete reciprocating movement.

As disks 117 make a complete revolution for each complete reciprocating movement of bar 109 and as it is necessary that bar 109 remain at rest for a certain period of time to permit the operator to remove a mold structure 44 and insert another as will more fully hereinafter appear. Means are provided whereby the disks 117 are intermittently rotated preferably comprising a Geneva gear arrangement. The Geneva gear includes a crank member 121 supported on a shaft 122 suitably journaled on the frame. Crank member 121 carries an inwardly projecting pin 123. Disposed above member 121 and carried on a shaft suitably journaled from the frame is a driven member 124 provided with four equally spaced arcuate locking sections 125 adapted to engage a locking sector 126 of crank 121. Member 124 is further provided with four radially extending slots 127 uniformly spaced between sections 125 and adapted to consecutively receive the pin 123 so that upon each complete revolution of crank 121 member 124 will be rotated one quarter revolution and will be locked against rotation except when engaged by the pin 123 by means of the engagement of locking sector 126 with locking sections 125. Shaft 122 and crank 121 are driven continuously from any suitable prime mover.

As member 124 is given only a quarter revolution upon each revolution of member 121 it is necessary that disk 117 and member 124 be geared together so that disk 117 will be given a complete revolution upon each quarter revolution of member 124, and to provide for this member 124 is provided with and drives a gear 128 meshing with a pinion 129 supported on and driving shaft 119 of the disks 117, the ratio of gear 128 to pinion 129 being four to one. Shaft 119 and the shaft for member 124 are suitably supported by brackets 131 as shown in Figure 9. Members 121 may be provided with pulleys 132 for driving engagement with a driven belt or sprocket gearing or other suitable means may be employed.

Journaled at each end of frame 95 between the legs 96 are sprocket wheels 134, around which conveyor chains 135 are supported. Chains 135 are provided with rollers 136 which upon movement of the sprocket wheels successively engage within the curved recesses in the peripheries of the sprocket wheels in well known manner. Attached transversely of the chains 135 are a plurality of slats or cleats 137 which form a movable endless conveyor for a purpose later described. The upper run of the conveyor may be suitably supported on a track in well known manner.

The conveyor is adapted to support and propel screens upon which the ejected sausages are deposited in readiness for a smoking process, or upon which trays of sausage containers are supported for receiving the sausages, when same are to be marketed without smoking or as green sausages in a manner hereinafter more fully described.

The screens for this purpose may be of any desirable construction but preferably are of the construction disclosed in Figures 3 and 4 wherein each screen 139 comprises a marginal frame member 141 of comparatively heavy material and preferably rectangular in cross section. Extending longitudinally of the frame member are a plurality of wires 142 which are spaced transversely of the frame member so that the center line between each two wires of each adjacent pair thereof will coincide with the center line of each consecutive pusher 111 adacent pairs of wires being spaced from each other a distance such as to support adjacent sausages spaced at a proper distance for effective treatment and in a manner to hold the sausage straight. Extending transversely of the frame member 141 are a plurality of comparatively widely spaced strengthening wires 143 similar to the wires 142 and extending thereunder as clearly shown in Figure 4. The ends of all the wires 142 and 143 preferably terminate flush with the edge of the frame member 141 and rest in arcuate recesses 144 in frame member 141 and secured therein by welding or by any other suitable means. Extending longitudinally of the frame member 141 are a pair of braces each of which comprises a tubular member 145 having widened flattened ends 146, which are suitably secured to the end portions of frame member 141.

In order to effect propulsion of the screens 139 commensurate with the movement of the conveyor certain of the slats 137 are provided with transversely extending screen pushing members 148 which are regularly spaced throughout the length of the conveyor at a distance equal to the length of the screens 139. The conveyor is further provided with a plurality of laterally disposed screen locating and centering members 149 which are preferably formed by bending up the ends of certain of the slats 147 and are regularly spaced intermediate the members 148.

Extending outwardly from the ends of certain of the slats 137 are a plurality of pins 151 which are regularly spaced and preferably six such pins are provided between each two successive pushing members 148. The pins 151 may be provided on one side only of the conveyor or on both sides as desired.

Pivotally supported on the bracket 107 of the carriages 106 are gravity pawls 152 which are limited in movement opposite to the direction of operative travel of the conveyor by engagement with pins 153 projecting from brackets 107 and which upon forward movement of the carriages are adapted to engage the pins 151, the pawls being free to pass the pins 151 upon opposite or rearward movement of the carriages 106.

Carried by the rear sprocket wheels 134 are ratchet wheels 155 and carried by the frame 10 are pawls 156, which by gravity normally engage the teeth of the ratchet wheels preventing reverse rotation thereof but permitting the ratchet wheels 155 to rotate forwardly or in the direction of operative travel of the conveyor. The conveyor is adapted to support and convey a pair of the screens 139 which are engaged by the members 148 and 149 carried by the slats and a suitable table 157 is provided with the surface thereof in horizontal alinement with the outer surface of the outer run of slats 137 whereupon the screens 139 are automatically pushed onto the table 157 upon operative movement of the conveyor.

In the operation of the ejecting apparatus just described the operator places screens on the conveyor and a mold structure on the guide rods 101 with one of the side bars thereof in engagement with the guide 102, the pushers 111 carried by the pusher bar 109 being moved in telescoping engagement with the tubes of the mold structure and retracted therefrom upon each complete revolution of disks 117 through the instrumentality of carriages 106 and rods 115 pivotally connected to the carriages and disks as above set forth.

It is to be noted however that while the member 121 is continuously driven the disks 117 are given a complete revolution during the time the member 121 makes a quarter revolution, the remainder of the time required for the member 121 to complete its revolution permitting the operator to remove the empty mold structure and insert a loaded one during which time the pushers 111 are at rest.

As the carriages 106 move forward pawls 152 carried by brackets 107 engage transversely alined pins 151 on slats 137 thus moving the conveyor and the screens 139 carried thereby forward at the same rate of travel of the carriages and the pushers, thus permitting the extruded sausages to fall upon the screens without any relative sliding or rubbing action, whereby the molded surfaces are maintained smooth and intact.

Upon reverse movement of the carriages 106 at which time the pushers 111 are retracted from the tubes of the mold structure pawls 152 ride over the next adjacent pair of pins 151 to be engaged therewith upon the next forward movement of the carriages, and as the carriages move backward the conveyor is prevented from reverse movement by means of the cooperating ratchet wheels 155 and pawls 156.

The sausages after being ejected from the molds in the manner above disclosed are subjected, if desired, to a smoking process. Or the sausages if marketed in unsmoked condition are inserted in the containers simultaneously with the ejecting process as will be later described.

When the molded sausages are to be marketed in smoked condition, they are conveyed to a smoke house of any approved type on the screens, that receive them, after ejection from the molds, and they are subjected to a slow, relatively cold, smoke. Preferably before subjecting the molded sausage to the action of the smoke they are dried for about one hour, at a temperature of about 60° F. in an atmosphere having a humidity of about 50 to 60 percent. The molded sausages are then smoked on the screens, preferably for about five hours at a temperature of 80° to 90° F. During the smoking operation the sausages are turned on the screens to expose the portions of the surface thereof that contact with the wires of the screen to the curing action of the smoke. This smoking action is carried out at lower temperatures, than customary in curing other meat products, and it is found that at such temperatures the molded sausages maintain their form and withstand relatively rough handling.

The smoked sausage are then ready to be packaged in containers which are designed in a manner to keep the sausages separate or from contact with each other, thus greatly facilitating the keeping qualities thereof and preventing wedging of the sausages against one another thus tending to disrupt the smooth molded walls.

A preferred form of container or package for this purpose is illustrated in Figures 10, 11, and 12, and comprises a cardboard box 159, which may be of any desired capacity, but, as illustrated, preferably of such capacity as to accommodate two trays 161, constructed of waxed cardboard, with one disposed over the other within box 159, as illustrated in Figure 12. Each tray is adapted to support a single layer of sausages in separated relation.

Each tray 161 comprises a cardboard base 162 to which is suitably secured as by a suitable adhesive a corrugated cardboard strip of a width equal to the length of base 162. The strip is corrugated or folded in such manner as to provide opposite walls of single thickness 163 for engagement with the side walls of box 149 and double walled partitions of loop formation 164 intermediate walls 163. The base portion of the strip between the walls 163 and partitions 164 is secured to base 162 and provides with the walls and partitions a plurality of compartments 165 each of a size to accommodate an individual sausage, as indicated in Figures 11 and 12. Each portion of each fold 164 may be slightly spaced apart from the adjacent portion so as to be capable of flexing slightly toward and from each other thus providing slightly resilient lateral support for the individual molded sausages.

Each of the walls 163 may be provided with a flap 166 those of the lower tray within the box serving as supports for the opposite side edges of a spacer or separator 167 which in packing, is disposed on the outer edges of partitions 164 for completely individually enclosing the sausages within the lower tray and forming a continuous support for the base member 162 of the upper tray. Such spacer may be omitted, if desired. The flaps 166 of the upper tray are engaged by side edge flaps 168 of box 159. The box 159 is provided with a cover 169 preferably having an integral hinged connection with one end of the box, and provided with a flap 171 on the free edge thereof, which flap is adapted for insertion between the corresponding end of the box and the adjacent end of the trays for holding the lid 169 in closed position. The lid 169 is provided with a rectangular cut-out 172, which is closed as by a sheet of transparent paper 173, whose edges are suitably secured by fluid tight joints to the inner surface of lid 169, whereby the major portions of the sausages in the upper tray are visible and subject to the beneficial preserving action of the light.

After packing the filled trays 161 within box 159, as above disclosed, the lid 169 is closed and a suitable binding strip 174 may be secured to the upper side edges of the box, as well as the end edge opposite the hinged connection of lid 169, as is clearly indicated in Figure 10, whereby the sausages are enclosed in an air tight manner. In handling the trays one of the double walled partitions may be grasped as a handle, thus making it unnecessary for the packer to touch the sausage with his hands.

When the sausages are to be marketed without smoking or in a green state, they are preferably dropped directly into the trays 161 as they are ejected from the molds. This may be accomplished in the manner disclosed in Figure 13, wherein is disclosed a mold structure 44' having longer tubes 46' than those disclosed in Figures 1 and 5 for providing relatively long thin sausages, corresponding to the carton illustrated. It will be understood, of course, that the mold tubes may be of any desired length as well as diameter depending upon the size of the sausages desired.

As indicated in Figure 13 a plurality of trays 161 may be placed on screens 139 in such manner that the forward ends of the trays will be in vertical alinement with the corresponding ends of tubes 46' when pushers 111 begin to enter tubes 46' upon forward movement of carriages 106. As screen 139 moves simultaneous with pushers 111 the trays 161 will move in unison with the excluded sausages whereby when a row of trays has reached the position indicated in Figure 13, the molded sausages within tubes 46' will have been ejected and deposited within the compartments 165 of trays 161.

The trays may be placed on the screens to the right of carriages 106 and accurately positioned by suitable indicating means, such that the trays will come into correct position to receive the sausages in the manner above set forth and the filled trays will be carried forwardly by the screens onto the table 157 where they may be removed by an attendant and subsequently placed in the boxes 159, and sealed in the manner above disclosed. The green sausages when packed in this manner withstand ordinary handling temperatures and the relatively rough usage incident to transportation, and hold their form during the cooking, frying or other treatment necessary to prepare them for consumption.

It is believed that the reason the molded sausages retain their form during handling and cooking thereof and at ordinary temperatures lies in the fact that during the molding under pressure the fats and colloids are freed from the solid particles of comminuted meat filling the very small voids between such particles and the smooth walls of the molds. With the fats and colloids in this condition, the fats are solidified during the chilling of the meat and a chemical and/or physical change takes place in the colloids the combination of the solidifying of the fats and change in the colloids resulting in a substantially homogeneous product having smooth outer surfaces that is able to retain its form during handling and cooking, unlike comminuted meat molded under the usual conditions. When packaged as above described, the individual sausages are protected from destruction due to wedging one against another, and from action of the bacteria present in the atmosphere. At the same time, light is permitted to enter the package through the transparent material in the top thereof inhibiting bacterial action. Said material also, of course, serves to display the contents of the package.

If desired, the molded sausages may be packed in an atmosphere that can not cause bacterial action. To this end, solidified carbon dioxide or "dry ice" may be placed in the container or on the trays before the sausages are packed, or during the packaging thereof. The freed carbon dioxide causes the air to be expelled from the box and it is in this gas in which the sausages are placed, when packed. Bacterial action due to the presence of air in the container is accordingly prevented. Any other inert gas may be utilized to fill the container, though carbon dioxide is at present preferred.

If deemed desirable a small container having a quantity of "dry ice" may be placed in the container before it is sealed, whereby the sausage may be maintained at a low temperature due to refrigerating effect resulting from the change of the carbon dioxide from the solid to the gaseous phase. If this arrangement is employed suitable openings for the escape of the gas from the container may be provided, that is, the package is not sealed so as to be fluid tight.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:—

1. The process of forming a food product from comminuted meat without a skin or casing; consisting in progressively filling molds with the meat under pressure effective in the molds throughout the filling and sufficient in degree to cause the juices to exude from the meat particles, subjecting the molded product while in the molds to a chilling action to set a portion of said juices to cause the comminuted particles of meat to adhere to each other, and ejecting the chilled molded meat from the molds.

2. The process of forming a food product from comminuted meat without a skin or casing, consisting in progressively filling molds with the meat under pressure effective in the molds throughout the filling and sufficient in degree to cause the juices to exude from the meat particles, subjecting the molded product while in the molds to a chilling action to set a portion of said juices to cause the comminuted particles of meat to adhere to each other, ejecting the chilled molded meat from the molds, and curing the molded units by smoking at a relatively low temperature.

CHARLES H. VOGT.